July 23, 1935. A. E. DROBISH 2,008,855

REGULATING SYSTEM FOR DYNAMO ELECTRIC MACHINES

Filed Oct. 12, 1932

INVENTOR
A. E. DROBISH
BY H. A. Whitehorn
ATTORNEY

Patented July 23, 1935

2,008,855

UNITED STATES PATENT OFFICE 2,008,855

REGULATING SYSTEM FOR DYNAMO-ELECTRIC MACHINES

Adolph E. Drobish, Chicago, Ill., assignor to Western Electric Company, Incorporated, New York, N. Y., a corporation of New York Application October 12, 1932, Serial No. 637,436

9 Claims. (Cl. 171—312)

This invention relates to a regulating system for dynamo-electric machines.

When dynamo-electric machines, such as generators, convertors, and the like, are subjected to varying loads, the output voltage will vary unless regulating means are provided to keep the voltage constant.

An object of the present invention is to provide an effective and efficient regulating means for a dynamo-electric machine.

In accordance with one embodiment of the invention, a portion of the field current of a generator is supplied through an electronic tube or a number of tubes in parallel, the resistance of the tube or tubes being controlled by a tube in a bridge circuit which is associated with the output of the generator.

Figure 1:
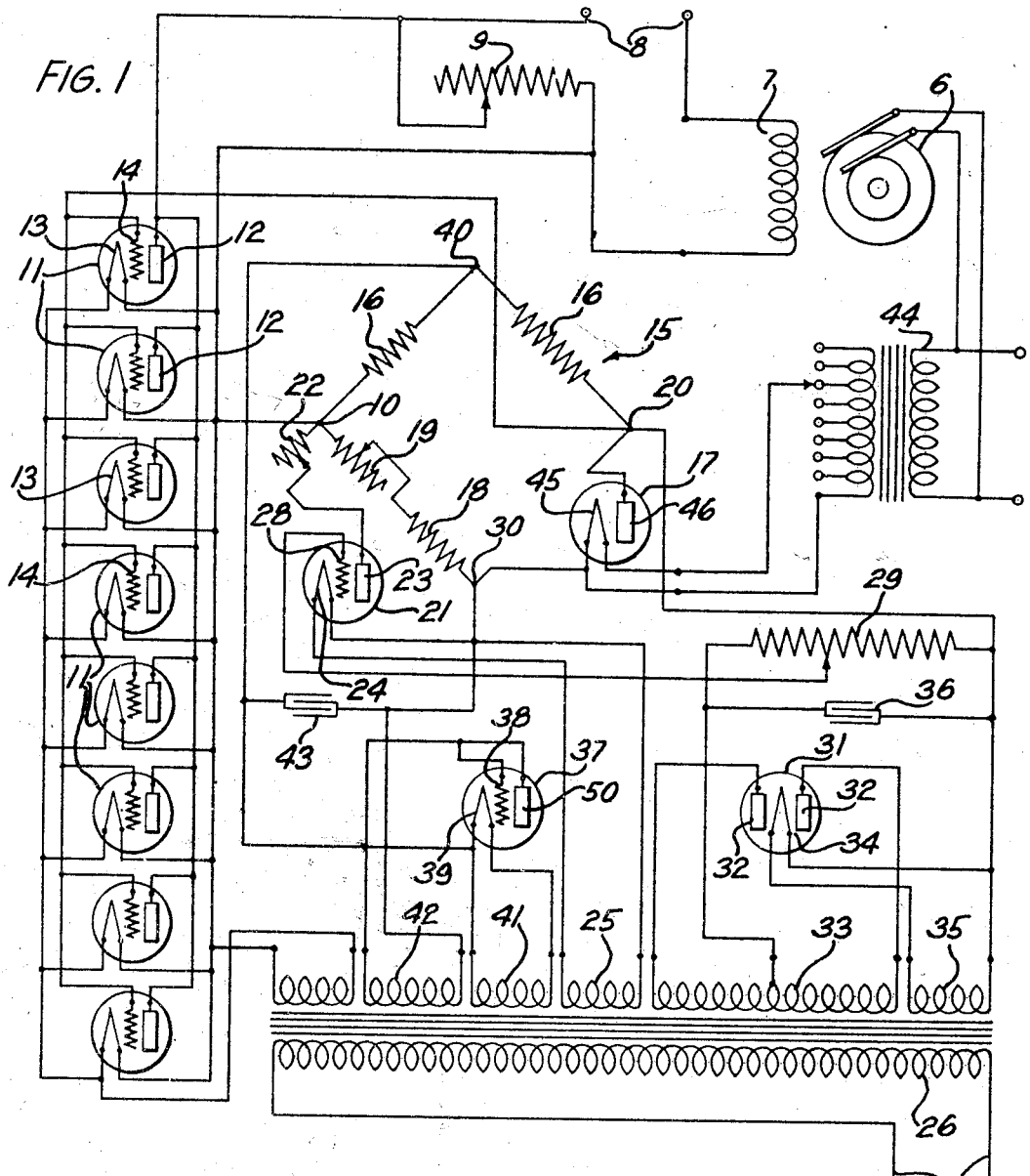
Figure 2:
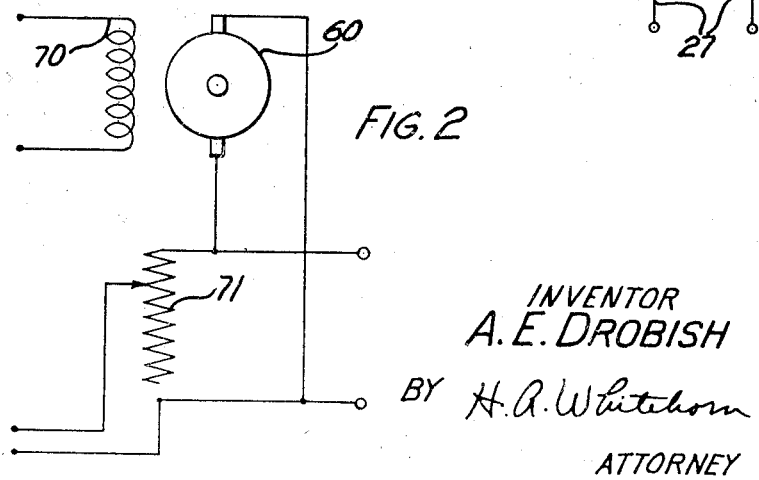

A complete understanding of the invention may be had by reference to the following description taken in conjunction with the accompanying drawing, in which Fig. 1 is a circuit diagram of a regulating system embodying the invention, as applied to an alternating current generator, and Fig. 2 is a circuit diagram of a portion of the system showing the invention as applied to a direct current generator.

In the drawing an alternating current generator 6 is shown having a field winding 7, the current through which is to be varied to vary the excitation of the generator so as to maintain the output voltage of the generator constant, even though the output load and speed of the generator may vary. The field winding of the generator is supplied from a direct current line 8, one side of which is connected directly to the field winding, while the other side passes in parallel through an adjustable resistance 9 and through a plurality of electronic tubes 11 which are connected in parallel. The tubes 11 may be of the well-known three element type having their anodes 12 and cathodes 13 in the field circuit of the generator. In addition each tube has a control electrode or grid 14 which are all connected in parallel. Thus the tubes 11 act as current limiting devices for regulating the exciting current supplied to the field winding 7 in accordance with the potential impressed upon the grids. The grids and cathodes of the tubes are connected to the output points 10 and 20 of a Wheatstone bridge circuit 15 which has resistances 16 in two arms thereof, while the third arm has an electronic tube 17 therein of the two element type in which the resistance varies in accordance with the temperature of the filament or cathode. The filament of this tube is preferably made of a fine tungsten wire so that its heating will have a minimum time lag and the temperature of the filament will vary with small changes of current to render the system extremely sensitive. The fourth arm of the bridge may consist of a fixed resistance 18 and a variable resistance 19. However, for more effective regulation the fourth arm may consist of two parallel branches, one comprising the resistances 18 and 19 and the other comprising an electronic tube 21 and a variable resistance 22. Tube 21 is preferably of the three element type having its anode 23 connected to the output point 10 on the bridge and its cathode 24 connected to an input point 30 of the bridge. This cathode may be energized from a secondary winding 25 of a transformer 26 which may be connected to any suitable alternating current line 27. The grid 28 of tube 21 is connected to the output point 20 of the bridge through a potentiometer resistance 29, the purpose of which will be described hereinafter.

The potential drop in the resistance 29 is provided by a rectifier comprising a double wave rectifier tube 31, the anodes 32 which are energized by a secondary winding 33 of transformer 26, and the cathode 34 of which is energized by the secondary winding 35. The output of the rectifier is connected to the ends of the resistance 29 and is shunted by a condenser 36 to smooth out the current supplied to the resistance.

The current for the bridge is obtained from a rectifier circuit, preferably having a three electrode rectifier tube 37, having its grid 38 and anode 50 connected in parallel. The cathode 39 is energized by the secondary winding 41 of transformer 46 and the anode circuit is energized from a secondary winding 42. The output of this rectifier circuit is shunted by a condenser 43 to smooth out the current applied to the input points 30 and 40 of the bridge circuit.

In order to make the system responsive to the output voltage of the generator 6, a variable transformer 44 is connected across the output line of the generator. This transformer is connected to the cathode 45 of tube 17 in the bridge circuit, which cathode is also connected to the input point 30 of the bridge circuit 15, while its anode 46 is connected to the output point 20 of this circuit.

The operation of the system is as follows: When no load is taken from the generator and the generator is running at the maximum speed that it will ordinarily attain, resistances 19 and 22 are adjusted to apply such a potential to the grids of tubes 11 that the tubes will operate on the lower straight portion of their grid voltage-plate current curves. If now a load is applied to the generator or the speed of the generator decreases so that its output voltage has a tendency to drop, the current through cathode 45 of tube 17 in the arm of the bridge circuit will decrease and thereby decrease the temperature of this cathode, which results in an increase in the resistance of this tube. The increase in resistance tube 17 causes a higher or more positive potential to be applied to the grids 14 of tubes 11. This results in a decrease of the resistance of tubes 11, increasing the exciting current in winding 7 to maintain the output voltage of the generator constant. When the tube 21 is used, the potential of its grid 28 is adjusted by adjusting the potentiometer resistance 29 to such a point that the tube 21 will operate on the straight portion of its grid voltage-plate current curve at a time when the output voltage tends to drop in spite of the regulation produced by tube 17; thus it will be seen that at no load the tube 21 will be practically ineffective so that in starting from no load the tube 17 will first come into play and when it is incapable of maintaining the entire regulation, the tube 21 comes into play.

It will be evident that the regulator may be readily applied to a simple or single wound generator because the exciting current decreases as the output voltage tends to increase. It has been found that with the regulator system just described, the output voltage of a 65 volt alternating current generator may be kept within ±.05 volt with a load variation of 50 to 800 milliammeters.

Fig. 2 illustrates the application of the system to a direct current generator 60 having a field winding 70. The transformer 44 of the alternating current system is replaced in this instance by a variable resistance 71 in series with the filament of tube 17 and connected across the output leads of the generator.

While the invention has been described in connection with alternating current and direct current generators, it is evident that the invention is readily adaptable to motors, convertors, and other types of dynamo-electric machines by regulating the field or armature currents in accordance with the invention.

It will be understood that the nature and embodiment of the invention herein described and illustrated are merely convenient and useful forms of the invention and that many changes and modification may be made therein without departing from the spirit and scope of the invention.

What is claimed is:

1. A regulator system comprising a dynamo-electric machine, a variable impedance element in a circuit of the machine to be controlled, a Wheatstone bridge circuit connected to said element to control the impedance thereof, an electronic tube having electrodes in one arm of the bridge circuit and a control electrode, means for applying a biasing potential to the control electrode to determine its range of control, and means included in the bridge circuit for applying a control potential to the control electrode, said last mentioned means being responsive to a condition of the machine to be controlled.

2. A regulator system comprising a dynamo-electric machine, a variable impedance element in a circuit of the machine to be controlled, a Wheatstone bridge circuit connected to said element to control the impedance thereof, an electronic tube having electrodes in one arm of the bridge circuit and a control electrode, and means included in the bridge circuit for applying a control potential to the control electrode, said last mentioned means being responsive to a condition of the machine to be controlled.

3. A regulator system comprising a dynamo-electric machine, a bridge circuit, an electronic tube having electrodes in one arm thereof, a second electronic tube having electrodes in another arm thereof and having a control electrode, said control electrode being connected across the first tube to be responsive to the impedance drop therethrough, means for controlling the impedance of said first tube in accordance with a condition of the machine to be controlled, and means responsive to the output of the bridge circuit to regulate the machine.

4. A regulator system comprising a dynamo-electric machine, a bridge circuit having a variable impedance element in one arm thereof, means responsive to a condition of the machine for varying the impedance of said element, an electronic tube having its cathode and grid connected to the output points of said bridge, the cathode and anode of said tube being connected in parallel with a second arm of said bridge to vary the impedance thereof inversely with respect to the impedance element in said first arm, and means responsive to the output of said bridge circuit for controlling said condition.

5. A regulator system comprising a dynamo-electric machine, a bridge circuit having a variable impedance element in one arm thereof, means responsive to a condition of the machine for varying the impedance of said element, an electronic tube having its cathode and grid connected to the output points of said bridge, the cathode and anode of said tube being connected in parallel with a second arm of said bridge to vary the impedance thereof inversely with respect to the impedance element in said first arm, means for biasing said tube to cause it to be effective through a predetermined range, and means responsive to the output of said bridge circuit for controlling said condition.

6. A regulator system comprising a dynamo-electric machine, a bridge circuit, an electronic tube in one arm of said circuit and having a cathode and anode, means for varying the temperature of said cathode in accordance with voltage variations of said machine, a second electronic tube having a cathode, anode, and grid, said cathode and anode being connected in parallel with another arm of said bridge and the cathode and grid being connected across the arm of the bridge containing said first mentioned tube, and means responsive to the output of said bridge for controlling the voltage of said machine.

7. A regulator system comprising a dynamo-electric machine, a bridge circuit, an electronic tube in one arm of said circuit and having a cathode and anode, means for varying the temperature of said cathode in accordance with voltage variations of said machine, a second electronic tube having a cathode, anode, and grid, said cathode and anode being connected in parallel with another arm of said bridge and the cathode and grid being connected across the arm of the bridge containing said first mentioned tube, and an electronic device responsive to the output of said bridge circuit for controlling the voltage of said machine.

8. A regulator system comprising a dynamo-electric machine, a control device in a circuit of said machine, a bridge circuit for varying the effectiveness of said device, an electronic tube having a cathode and anode in one arm of the bridge circuit, and means for varying the temperature of said cathode in response to a condition of said machine to vary the impedance of said tube and regulate the machine.

9. A voltage regulator system comprising a generator having a field winding, a variable impedance device for controlling the current in said field winding, a bridge circuit for controlling said variable impedance, an electronic tube having a cathode and anode in one arm of said bridge circuit, and means for varying the temperature of said cathode in response to the voltage of said generator to vary the impedance of said tube and control the voltage of the generator.

ADOLPH E. DROBISH.